Oct. 4, 1932.  J. G. CAPSTAFF  1,880,414
ILLUMINATING SYSTEM FOR PHOTOGRAPHIC APPARATUS
Filed Jan. 3, 1930
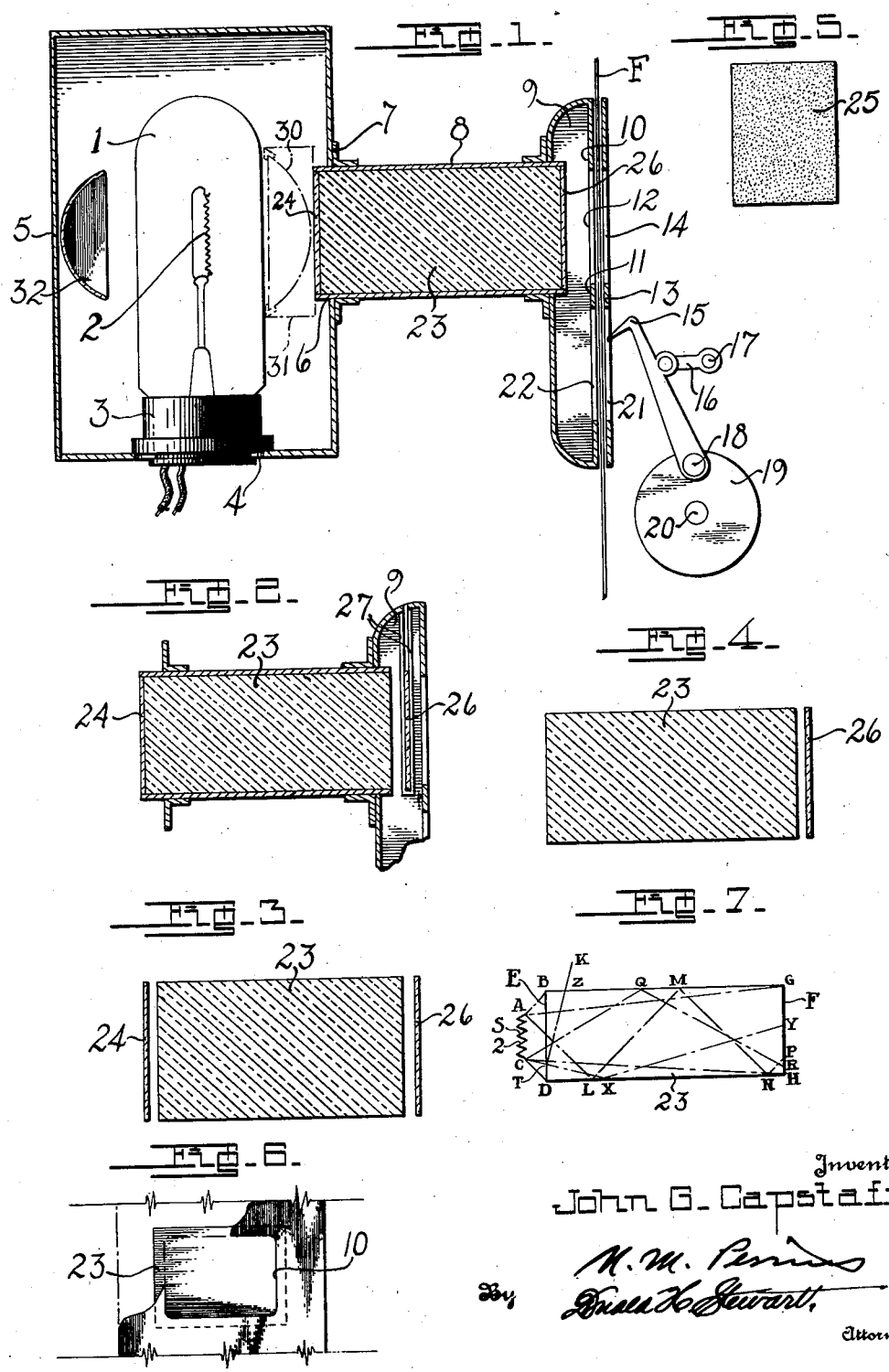
Inventor
John G. Capstaff Patented Oct. 4, 1932

1,880,414

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

ILLUMINATING SYSTEM FOR PHOTOGRAPHIC APPARATUS

Application filed January 3, 1930. Serial No. 418,247.

This invention relates to photography and more particularly to illuminating systems for photographic apparatus. One object of my invention is to provide an illuminating system which will produce an intense light, evenly diffused. Another object of my invention provides an illuminating system which is efficient even though the lamp is spaced some distance away from the object to be illuminated. Another object of my invention is to provide an illuminating system which is compact and will require but little room, and other objects will appear from the following specifications, the novel features being particularly pointed out in the claims at the end thereof.

In motion picture apparatus such as projectors, motion picture printing machines and other devices of this nature, it is necessary to illuminate evenly a particular field. This field may be a photographic film passed through a projector, or it may be a positive and a negative film passed through a machine for printing, or a flat picture which it is desired to illuminate with uniform intensity.

It has been customary to use, for producing such an even illumination, a concentrated filament lamp, an arc lamp or some such source of light in connection with a light condensing system wherein condensing lenses are usually employed. While this produces a very intense light, it has some disadvantages in that the light is not perfectly evenly diffused. On the other hand if a perfectly diffusing medium is used, the light intensity is greatly reduced.

However, if diffusing mediums, of ground glass or flashed opal, are used, the light intensity is not reduced to such a degree since they are not perfectly diffusing mediums. Thus more light is available for transmission by an internally reflecting prism to a plane spaced some distance from the light source. Furthermore, use of an internally reflecting prism for the transmission of light from one diffusing medium to the desired plane of illumination directly or through another diffusing medium results in an extremely even and an intense illumination at a distance from the source.

Coming now to the drawing wherein like reference characters denote like parts throughout;

Fig. 1 is a section through motion picture apparatus including an illuminating system constructed in accordance with and embodying a preferred form of my invention;

Fig. 2 is a section through a part of another type of illuminating system constructed in accordance with my invention;

Fig. 3 is still another type of illuminating system;

Fig. 4 shows in section a quartz block equipped with a diffusing medium spaced from the end of the quartz block;

Fig. 5 is a plan view of a light diffusing medium such as ground glass;

Fig. 6 is a front elevation partly broken away showing the relation of a quartz block to the picture frame;

Fig. 7 is a diagram used to explain my invention.

In order to explain my invention more readily, I will refer to the diagram in Fig. 7. A light source S is shown as near the end E of the internally reflecting prism. The source is an ordinary filament more or less extended and illuminating the end E brightly but irregularly, the limiting rays being AB and CD. The opposite end F would be more evenly and less brilliantly illuminated by direct rays from the source, the limiting rays being AG and CH and still less irregularly and less brilliantly illuminated by the light between rays BA, AG, CH and CD from the source which enter the end E and by internal reflection are diffused and transmitted to the end F. Typical rays are shown as ALMNP and CQR. If both surfaces E and F are polished, an observer looking through the block would see an infinite number of images of filament S as in a kaleidoscope.

If the surface E is ground each point becomes a source of rays such as TXY that are repeatedly reflected toward F, providing their angle of incidence on the walls of the prism is more than the critical angle. The surface F is thus quite evenly illuminated from the patternless reflections.

In practice I mount a condenser lens shown in Fig. 1 so that the entering rays approximate parallelism to the axis and the number lost by penetration of the walls at less than the critical angle is reduced. I also provide diffusing surfaces at both ends of the prism.

It will be seen that I am not merely utilizing an internally reflecting bar to bring forward an image but am utilizing the multiple reflecting powers of its walls to blend the rays from an irregularly illuminated area which are otherwise lost into a beam of more uniform illumination.

I will now describe some of the practical embodiments of my invention.

As indicated in Fig. 1, a source of illumination is shown as consisting of a lamp 1 preferably of the concentrated filament type having a filament at 2, the lamp being supported in a suitable base or socket 3 which is slidably mounted in slot 4 in the bottom of a lamphouse 5.

The lamphouse 5 is provided with an opening 6 around which an L shaped flange 7 extends. This flange supports one end of a housing 8 which connects the lamphouse 5 to a housing 9 in which a film gate 10 is mounted.

The film gate which is designated broadly as 10 comprises a plate 11 having a rectangular opening at 12 and a second plate 13 having a rectangular opening 14 in alignment with the opening 12. A photographic film F may be passed between these two plates which form the film gate 10 so that the picture area is exposed between the two openings.

The film may be intermittently moved in the usual manner, that is, a claw 15 be mounted on a link 16 pivoted at 17 to the machine, the claw 15 also being pivoted at 18 to a disk 19 adapted to be rotated by power applied to the shaft 20.

This claw extends through slots 21 and 22 in the plates 13 and 11, and while this form of pulldown is illustrated as a preferred type, any well known pulldown mechanism may be used, since the part of the apparatus forms no part of my present invention.

A quartz block 23 fits loosely into the housing 8 so that a layer of air is provided for the surfaces of the quartz to give perfect reflection. The block 23 may be either natural quartz or fused quartz which is ordinarily considerably cheaper.

That end of the quartz block 23 which lies closest to the lamp 1, is somewhat ground and in addition I prefer to add a diffusion medium in the form of a flashed opal glass sheet 24. Ground glass such as shown in Fig. 5 at 25 may be used if desired, but I find that flashed opal glass provides somewhat better results.

In the form shown in Fig. 1 there is also a second diffusing medium such as a sheet 26 which lies over that end of the internally reflecting block which lies closest to the film F. While this is useful in some instances, it is not always necessary and may be omitted where the character of the light source is such that the second diffusing medium is not necessary to obtain even illumination.

In the form shown in Fig. 2, the quartz block 23 is provided with a diffusing medium such as a diffusion sheet 24 at one end which lies close to or actually against the end of the block while at the other end the diffusing medium 26 is spaced from the end of the quartz block 23. Here the member 26 is slidably mounted so that it may be moved between rails 27 from the top of the housing 9 which permits the diffusing medium 26 to be readily inserted or removed as occasion may require.

Figs. 4 and 3 show the quartz block 23 equipped with diffusing mediums in slightly different relation. In Fig. 3 the mediums 24 and 26 are both slightly spaced from the ends of the quartz block and in Fig. 4 there is only one diffusing medium 26 spaced from that end of the quartz block which lies closest to the film.

It should be noted from Fig. 6 that the cross section of the quartz block 23 is proportional to the size of the exposure frame 10. In the present form it is shown slightly larger than the exposure frame or film gate, but it is only necessary to have it the same size. Of course, if it should be slightly smaller, the edges of the film gate would not be properly illuminated. By making the quartz block substantially the same shape as the film gate, practically all of the light falling on the surface of the block which is closest to the lamp will be carried to the film gate.

While the diffusing medium 24 is preferably located nearest the lamp where only one is used, the light at the opposite end of the glass block is more even than at the lamp end due to the fact that the light rays are internally reflected within the quartz block 23 back and forth until these rays intermingle to such an extent that an extremely even illumination is produced at the film gate.

In most photographic apparatus it is physically impossible to place the lamp very close to the film because of the mechanism required in such apparatus. In the arrangement shown in Fig. 1 the lamp 1 is spaced from the diffusing member 24 and the quartz block 23 only a sufficient distance to obtain as uniform illumination of the member 24 as is possible.

The actual effect of the quartz block 23 is to move the lamp 1 as close to the film as it is to the diffusing member 24, plus the extra diffusing effect which materially adds to the evenness of the light finally passing through the film gate 10.

The length of the quartz block 23 is therefore not necessarily limited except as such limits may be imposed by the construction of the photographic apparatus of which it forms a part. It is best, however, to have the quartz block of sufficient length to permit the light rays to be internally reflected to a considerable extent since this is useful in producing a more even illumination than would otherwise be the case.

Referring to Fig. 1, it should be noted that there is a condenser indicated in dot and dash lines at 30. This condenser is carried in a suitable slide 31 and may be entirely removed from the light path. It is not necessary to use a condenser with some lamps, but with others an increased evenness of illumination can be obtained by using a condenser and for this reason a place for it is included in the lamphouse 5.

It is also preferable to provide a reflector 32 behind the lamp filament as this assists in directing light rays which would otherwise be lost forwardly so that they will pass through the quartz block 23.

The phrase "a diffusing medium" as used in the specification and claims, contemplates the usual diffusing medium such as ground glass or flashed opal, which does not give perfect diffusion of light passing therethrough and which, as such, allows passage of light having greater intensity than passes a perfect diffusing medium. The reduction in the diffusing power of the medium increases the irregularity of the illumination passing through the medium. However, the diffusing action of the internally reflecting prism compensates for loss of diffusion in the diffusing mediums used. In actual practice, an opaque object, such as a pencil, may be placed between the light and diffusing medium 24 without affecting the regularity of illumination of the film in the gate.

The internally reflecting prism is preferably made of quartz, first because of its greater resistance to high heat and second because of its increased transmission of light which contributes to allowing the use of ground glass or flashed opal as diffusing mediums in place of perfect diffusing mediums without a corresponding decrease in the intensity of illumination.

Having thus described my invention what I claim as new and desire to secure by Letters Patent is:

1. In an optical apparatus, an exposure window, a source of light, an internally reflecting prism longitudinally placed between the source and the window with one end close to each, and a diffusing surface at each end of the prism.

2. In an optical apparatus, an exposure window, a source of light, an internally reflecting prism longitudinally placed between the source and the window with one end close to each, a light diffusing surface at each end of the prism, and a collecting lens between the source and the said diffusing surface.

Signed at Rochester, New York, this 30th day of December 1929.

JOHN G. CAPSTAFF.